Figure 1:
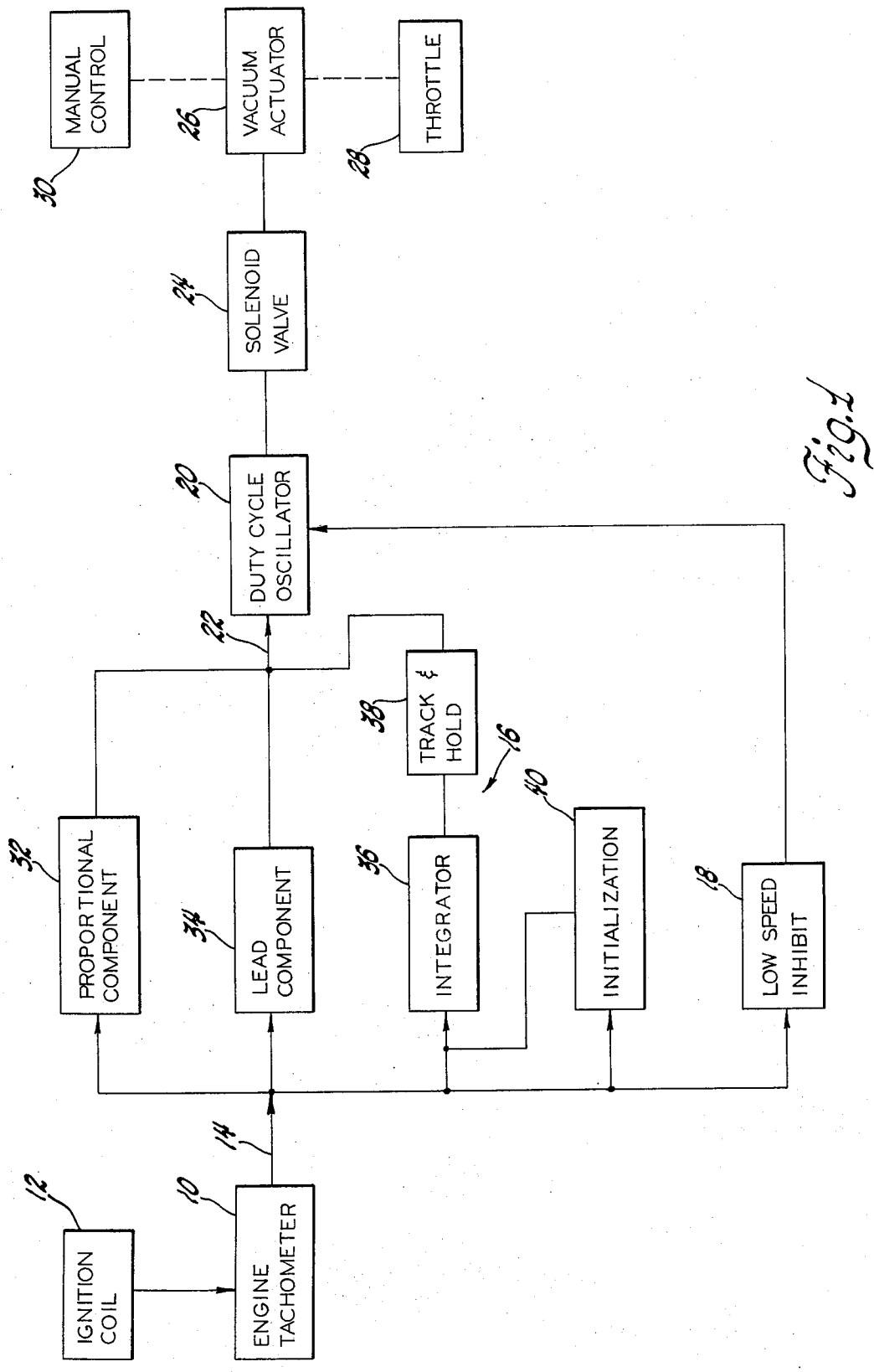

United States Patent [19]

Beyerlein et al.

[11] 3,998,191
[45] Dec. 21, 1976

[54] ENGINE SPEED LIMITING CONTROL CIRCUIT

[75] Inventors: David G. Beyerlein; Roland G. Kibler; Bruce H. Van Vlack, all of Flint, Mich.

[73] Assignee: General Motors Corporation, Detroit, Mich.

[22] Filed: Mar. 27, 1975

[21] Appl. No.: 562,680

[52] U.S. Cl. .............................. 123/102; 123/108; 180/105 E; 317/5
[51] Int. Cl.² ........................................ F02D 11/10
[58] Field of Search .......................... 123/102, 108; 180/105 E; 317/5, 19

[56] References Cited

UNITED STATES PATENTS

| | | | |
|---|---|---|---|
| 3,533,236 | 10/1970 | Cottington | 123/102 |
| 3,715,006 | 2/1973 | Walsh et al. | 123/102 |
| 3,724,433 | 4/1973 | Voss et al. | 123/102 |
| 3,738,340 | 6/1973 | Olsm | 123/102 |
| 3,752,249 | 8/1973 | Gelenius et al. | 180/105 E |
| 3,885,137 | 5/1975 | Ooya et al. | 317/5 |
| 3,949,359 | 4/1976 | Sorkin | 180/105 E |

Primary Examiner—Charles J. Myhre
Assistant Examiner—Paul Devinsky
Attorney, Agent, or Firm—Warren D. Hill

[57] ABSTRACT

A system for limiting the speed of a gasoline engine includes a circuit responsive to the engine speed which provides control signals to a solenoid valve which in turn controls a vacuum actuator. The vacuum actuator then overrides a manual throttle control to move the throttle towards closed position when a governed engine speed is approached. The control circuit provides a signal having three components: one proportional to engine speed, a second proportional to engine acceleration and a third which is the integrated difference between the engine speed and a preset governed speed. In addition, the third signal is high at low engine speed and gradually diminishes as engine speed increases to intermediate or high values. The control signal controls a duty cycle oscillator which actuates the solenoid valve. The duty cycle oscillator is inhibited at low speeds to prevent interference with manual throttle control.

3 Claims, 4 Drawing Figures

ENGINE SPEED LIMITING CONTROL CIRCUIT

This invention relates to engine speed limiters and particularly to an electrical control circuit for engine speed limiters.

It is common practice to provide governors on truck engines to prevent sustained speeds which are inefficient or harmful to the engine. Normally engine speed increases relatively slowly toward the governed speed during truck operation so that the governing operation is easily carried out, however, there are abnormal situations when very rapid engine acceleration occurs so that the speed limiting control must anticipate an overspeed condition in order to make a correction in time to avoid engine damage. This might occur, for example, when the vehicle transmission is in neutral or the clutch disengaged and the acceleration pedal is depressed to rapidly drive the engine from idle speed to critical speed.

It is therefore a general object of the invention to provide an electrical control circuit for an engine speed limiter which has the capability of anticipating overspeed in order to condition the speed limiter for a quick response to a sudden engine speed increase, as well as responding smoothly to gradual speed increases.

This invention is carried out by providing in a system for limiting engine speed a control circuit responsive to engine speed for producing a control signal with a component having a high value at low engine speed which gradually decays to a lower value at higher engine speeds and increases to high value again at engine speeds exceeding a governed value, and including a circuit preventing limiting action at low engine speeds.

Figure 2:
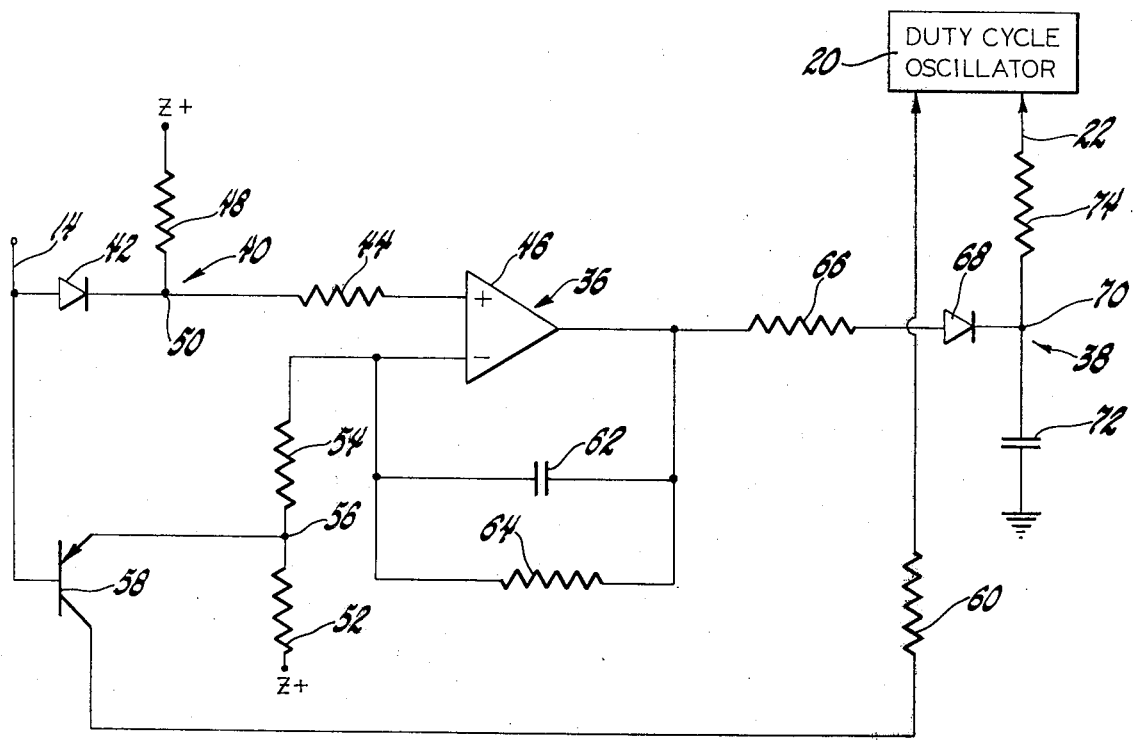
Figure 3A:
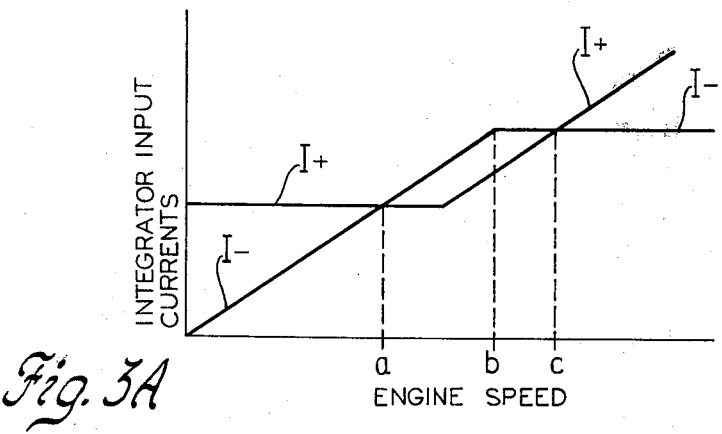
Figure 3B:
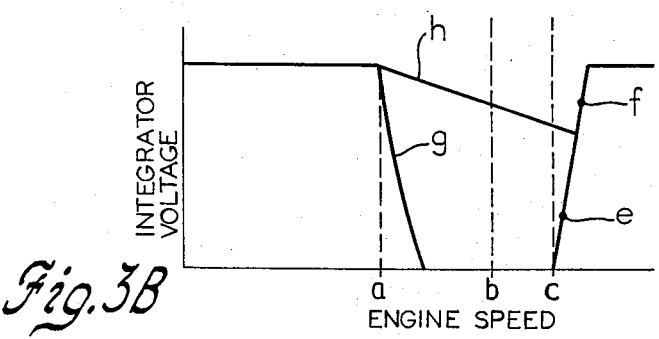

The above and other advantages will be made more apparent from the following specification taken in conjunction with the accompanying drawings wherein like reference numerals refer to like parts and wherein;

FIG. 1 is a block diagram of an engine speed limiting system including a control circuit according to the invention, FIG. 2 is a schematic electrical diagram of a portion of the control circuit of FIG. 1, and FIGS. 3A and 3B are graphs depicting integrator input currents and integrator output voltage, respectively, versus engine speed.

The engine speed limiting system is shown in the block diagram of FIG. 1. An engine tachometer 10 responsive to pulses from the engine ignition coil 12 produces on line 14 a voltage proportional to engine speed. The speed signal is then fed to a control circuit which includes a three channel modifying circuit 16, a low speed inhibit circuit 18 and a duty cycle oscillator 20. The modifying circuit 16 produces a control signal on line 22 which controls the duty cycle of the oscillator 20 as a function of the control signal. The duty cycle will be zero percent when no engine speed limiting is required and will increase generally proportionately to the control signal on line 22 provided that the engine speed is high. The oscillator 20 output controls a solenoid valve 24 which in turn energizes a vacuum actuator 26 which is positioned in a throttle linkage between the throttle 28 and the manual throttle control (accelerator pedal) 30. The overall operation of the system is such that when the engine speed signal on line 14 increases in such a manner that there is a danger of the engine exceeding its governed speed, the vacuum actuator will be energized to override the manual control 30 to move the throttle 28 towards its closed position. The degree of throttle closing will be proportional to the duty cycle of the oscillator 20 and hence proportional to the control signal on line 22 at high speeds. The low speed inhibit circuit 18 prevents operation of the duty cycle oscillator at low speeds.

The modifying circuit provides three components of the control signal as a function of engine speed. A proportional component circuit 32 comprises only a resistor which provides a component of the control signal proportional to the engine speed. The lead component 34 is a simple RC differentiator which provides a component of the control signal proportional to engine acceleration. The proportional and lead components lend smoothness and stability to the system, although at speeds above governed speed those components are much smaller than the integrated component described below.

The channel including the integrator 36 has a complex function, however, under normal conditions its main contribution to the control signal is the time integral of the excess of engine speed over governed speed which changes the duty cycle of the oscillator 20 to try to match the engine speed to the governed speed. A track and hold circuit 38 allows the integrator contribution to the control signal to increase quickly but limits the rate at which that component can decrease.

The initialization circuit 40 causes the integrator output to assume an artificially high value at low engine speeds. The initially high integrator signal influences the duty cycle oscillator only when the engine speed increases so rapidly that the track and hold circuit 38 remembers that signal after the low speed inhibit signal is removed. Thus the control signal 22 may go high and the vacuum actuator 26 may begin to close the throttle even before a very high engine speed is attained thereby anticipating the rapid engine acceleration toward an overspeed condition.

FIG. 2 is a schematic diagram of the integrator 36, the track and hold circuit 38, the initialization circuit 40, and the low speed inhibit circuit 18. The line 14 carrying the engine speed signal is connected through a diode 42 and a resistor 44 to the positive input terminal of an operational amplifier 46. A resistor 48 is connected between a regulated voltage source Z+ and a junction point 60 between the diode 42 and the resistor 44. Two resistors 52 and 54 are serially connected between Z+ and the negative terminal of operational amplifier 46. The junction point 56 of the resistors 52 and 54 is connected to the emitter of a transistor 58 which has its base connected to line 14 and its collector connected to a resistor 60. This input circuitry of the amplifier 46 comprises the initialization circuit 40. The collector circuit of the transistor 58 along with resistor 60 forms the low speed inhibit circuit. The operational amplifier 46 combined with a feedback capacitor 62 and a large resistor 64 in parallel with the capacitor 62 forms the integrator 36. The integrator output is fed through a resistor 66 and a diode 68 in series, the diode being connected at the junction point 70 of a capacitor 72 and resistor 74 which are connected between ground and line 22 respectively. The elements 68 through 74 comprise the track and hold circuit 38.

The operation of the circuit of FIG. 2 is explained with reference to the graph of FIG. 3A which depicts the integrator input currents versus engine speed wherein the current I+ is the input current to the positive input terminal of the integrator and the current I− is to the negative input. At low engine speeds (below 2500 rpm), the potential at junction point 50 is determined by resistors 44 and 48 and that potential is high enough (say, 2.8 volts) to backbias the diode 42. Thus the current I+ remains at a constant value until the speed signal voltage on line 14 exceeds the potential of junction point 50; thereafter the current I+ increases with increasing speed. At low engine speeds, the transistor 58 is conductive so that the potential of junction point 56 and the current I− follows the potential of the speed signal on line 14. When, however, the speed signal voltage exceeds the maximum potential (say 3.3 volts) at point 56 established by the resistors 52 and 54, the transistor 58 turns off and the potential at point 56 remains constant for increasing engine speed so that the current I− is constant at the hgher engine speeds. The constant current I− establishes the desired governed speed (4000 rpm) which occurs at point c where I+ intersects I−.

The integrator output voltage (as reflected at point 70) versus engine speed is shown in FIG. 3B. At speeds below point a, the current I+ is higher than I− causing the integrator output to assume a high value. Thus the initilization circuit 40 is responsible for an initially high integrator voltage at low speeds. The collector current of transistor 58 flowing through resistor 60 is applied to the duty cycle oscillator to prevent its operation until point b when the transistor 58 becomes non-conductive. Thus actuation of the speed limiter is prevented during low speeds and a portion of the intermediate speed range.

When the engine speed slightly exceeds point A, the current I− becomes larger than the current I+ so that the integrator voltage will drop. The discharge of the capacitor 72 through the resistor 74 will determine the maximum time rate of decrease of the potential at point 70; this time function is not reflected in FIG. 3B, however. The portion g of the curve indicates the form and slope the integrator voltage may take when engine speed is increasing at a moderate rate while portion h of the curve represents a typical slope when the engine speed is rising very rapidly. Assuming the engine speed increases moderately and the curve g is followed, the voltage will soon fall to zero. Then at point c, (the governed speed) current I+ exceeds the current I− so that the integrator voltage representing the time integral of the excess of engine speed (I+) over the governed speed (I−) is developed and increases with a steep slope. Since the low speed inhibit signal has terminated at point b, the rising integrator output is effective to energize the vacuum actuator 26 to decrease the throttle angle thereby responding to limit the speed. Normally a highly loaded vehicle will assume a speed at point e (say, 4025 rpm), slightly above point c, the governed speed, whereas a lightly loaded vehicle will assume a higher speed at point f, (say 4150 rpm).

When engine speed increases very rapidly such as may occur when the throttle is opened while the engine is unloaded, the voltage at point 70 will follow the curve h since the capacitor 72 does not have sufficient time to discharge during the engine acceleration. Thus as soon as the engine speed exceeds point b to turn off the low speed inhibit, the relatively high voltage at junction point 70 will cause operation of the duty cycle oscillator and of the vacuum actuator 26 thereby closing the throttle to anticipate an overspeed condition. Under such extreme conditions, the engine speed may momentarily overshoot to 4800 rpm, the speed will quickly be returned to a value near governed speed. It should be noted that during these limiting actions, the proportional and lead components of the control signal aid the integrated component in avoiding excessive overspeed. It will thus be seen that the control circuit according to this invention anticipates engine overspeed conditions and conditions a speed limiting actuator for a quick response to a sudden engine speed increase.

The embodiments of the invention in which an exclusive property or privilege is claimed are defined as follows:

1. In a system for limiting engine speed to near a governed value having means for limiting engine speed, a control circuit for actuating the limiting means comprising means for producing an electrical speed signal proportional to engine speed,
   a modifying circuit responsive to the speed signal for producing a control signal for energizing the limiting means as a function of engine speed,
   the modifying circuit including means for producing one component of the control signal having initially high value at low engine speed, gradually decaying to a lower value as the speed increases to intermediate engine speeds and increasing to high value at high engine speeds, the control signal being effective during intermediate and high speeds to energize the limiting means to a degree dependent on the signal value,
   and means for preventing energizing of the limiting means at low engine speeds,
   whereby the control circuit is conditioned to provide an energizing signal to the limiting means sufficient to limit engine speed near a governed value for both gradual and sudden engine acceleration.

2. In a system for limiting engine speed to near a governed value having means for limiting engine speed, a control circuit for actuating the limiting means comprising means for producing an electrical speed signal proportional to engine speed,
   a modifying circuit responsive to the speed signal for producing a control signal for energizing the limiting means as a function of engine speed,
   the modifying circuit including means for producing a first component of the control signal proportional to engine speed, and further means including an integrator for producing a second component comprising the integral of the excess of the engine speed over a governed speed, the further means including an initialization circuit effective at low engine speeds for producing a high integrator output and a delay circuit for allowing the second component to decay at a predetermined rate at intermediate speeds, the control signal being effective during intermediate and high to energize the limiting means to a degree dependent on the signal value,
   and means for preventing energizing of the limiting means at low engine speeds,
   whereby the control circuit is conditioned to provide an energizing signal to the limiting means sufficient to limit engine speed near a governed value for both gradual and sudden engine acceleration.

3. In a system for limiting engine speed to near a governed value having means for limiting engine speed, a control circuit for actuating the limiting means comprising means for producing an electrical speed signal proportional to engine speed, a modifying circuit responsive to the speed signal for producing a control signal for energizing the limiting means as a function of engine speed, a duty cycle oscillator responsive to the control signal for producing a pulsed output having a duty cycle generally proportional to the control signal, the pulsed output energizing the limiting means, the modifying circuit including means for producing a first component of the control signal proportional to engine speed, and further means including an integrator for producing a second component comprising the integral of the excess of the engine speed over a governed speed, the further means including an initialization circuit effective at low engine speeds for producing a high integrator output and a delay circuit for allowing the second component to decay at a predetermined rate at intermediate speeds, the control signal being effective during intermediate and high speeds for controlling the duty cycle oscillator to energize the limiting means to a degree dependent on the signal value, and means responsive to the speed signal for disabling the duty cycle oscillator at low engine speeds, whereby the control circuit is conditioned to provide an energizing signal to the limiting means sufficient to limit engine speed near a governed value for both gradual and sudden engine acceleration.

* * * * *